United States Patent [19]

Vali et al.

[11] Patent Number: 5,077,482
[45] Date of Patent: Dec. 31, 1991

[54] LIQUID GAUGE HAVING AN OPTICAL FIBER WITH FLEXIBLE MEMBRANE ENCLOSURE

[75] Inventors: Victor Vali, Laguna Hills; David B. Chang, Tustin; Patrick C. Brownrigg, Long Beach, all of Calif.

[73] Assignee: Hughes Aircraft Company, Los Angeles, Calif.

[21] Appl. No.: 484,295

[22] Filed: Feb. 23, 1990

[51] Int. Cl.⁵ .............................................. G01N 21/85
[52] U.S. Cl. .................................. 250/577; 250/904
[58] Field of Search ................... 250/577, 227.25, 904, 250/906, 907; 73/293

[56] References Cited

U.S. PATENT DOCUMENTS

| | | | |
|---|---|---|---|
| 4,287,427 | 9/1981 | Scifres | 250/577 |
| 4,644,177 | 2/1987 | Barabino | 250/577 |
| 4,745,293 | 5/1988 | Christensen | 250/577 |

*Primary Examiner*—David C. Nelms
*Assistant Examiner*—Que T. Le
*Attorney, Agent, or Firm*—Michael W. Sales; Wanda K. Denson-Low

[57] ABSTRACT

A fiber optic fuel or liquid level gauge is disclosed which determines the liquid level by measuring the amount of light loss due to evanescent transfer to the fuel or liquid. An optical fiber is supported in the fuel or liquid tank, with a first end adjacent the highest possible liquid level to be measured with a reflector at the first end. The optical fiber extends downwardly through the tank, and its second end is connected to a light source for injecting light into the fiber. The intensity of the input light is compared to the intensity of light reflected from the first fiber end, and the liquid level is calculated from the light loss. The gauge has very high reliability since it has no moving mechanical parts.

4 Claims, 3 Drawing Sheets

LIQUID GAUGE HAVING AN OPTICAL FIBER WITH FLEXIBLE MEMBRANE ENCLOSURE

BACKGROUND OF THE INVENTION

The present invention relates to fuel and liquid level gauges, and more particularly to a gauge which measures the fuel or liquid level optically by means of a fiber optic element.

Gauges for fuel and liquid tank levels are employed, for example, in vehicles. The most common type of fuel gauge that is used at present is an electro-mechanical gauge. A float element which stays on the fuel surface changes the position of a contact on a resistance wire as the fuel level changes. This is read out electrically and displayed on the vehicle dashboard. Such gauges are inaccurate and wear out with time because they have moving parts. The inaccuracies are aggravated by fuel tanks which have convoluted configurations.

U.S. Pat. No. 3,995,168 describes an electro optical fluid measurement system for display of the level and specific density of a liquid contained within a tank. The system employs a group of fiber optic bundles supported within a tank at a multiplicity of locations from the top to the bottom of the tank. The level is detected by measuring light from the respective groups of bundles to determine which bundle location is exposed above the liquid level. To achieve a large number of possible liquid level positions a corresponding number of fiber optic bundles must be used, thereby increasing the complexity and expense of the system.

It is therefore an object of the present invention to provide an improved fuel or liquid level gauge which is reliable and accurate.

A further object of the invention is to provide a fuel or liquid gauge which has no moving parts.

Yet another object is to provide a fuel or liquid level gauge which measures the liquid level optically.

SUMMARY OF THE INVENTION

A fiber optic liquid level gauge is provided in accordance with the invention for measuring the level of liquid in a tank. The invention exploits the evanescent wave loss from an optical fiber which occurs from fiber/liquid interfaces. The gauge comprises an optical fiber disposed within the tank and extending through the range of liquid surface level positions to be measured by the gauge. The fiber is characterized by an inner fiber core and an outer fiber cladding, the thickness of fiber cladding on the fiber portions which extends through the range of positions being selected to provide significant evanescent wave loss at cladding/liquid interfaces.

The gauge further comprises a light source for injecting light into the fiber in order to measure the liquid level. A measuring means is provided for measuring the degree of light intensity loss due to evanescent wave loss, and providing an intensity loss signal indicative of the light intensity loss. A liquid level indicating means responsive to the intensity loss signal indicates the liquid level in the tank.

The measuring means is calibrated to the particular tank and optical fiber configuration. In a preferred embodiment, the measuring means measures the intensity of light injected into the fiber, and measures the intensity of light which has traversed the fiber at least once, and develops an intensity ratio signal which is the ratio of the light intensity traversing the fiber to the incident light intensity. The ratio is indicative of the evanescent wave loss to the liquid and, therefore, provides a measure of the liquid level in the tank.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

This invention is a liquid or fuel level gauge which measures the liquid level by means of an optical fiber. The invention exploits the evanescent wave losses in an optical fiber which take place only when the fiber is submerged in the liquid, i.e., only at fiber/liquid interfaces. When the fiber is in air, the losses are minimal. Therefore, by disposing an optical fiber in the tank holding the liquid and by measuring the intensity of light which traverses the optical fiber, the position of the fuel level is obtained.

Principle of Operation

At the boundary of two dielectrics with respective indexes of refraction of $n_1$ and $n_2$, some light is refracted and some is reflected. By Snell's Law the corresponding angle $\alpha_1$ and $\alpha_2$ of reflection, and the indexes of refraction are related by $$\frac{\sin \alpha_2}{\sin \alpha_2} = \frac{n_1}{n_2}$$

When the beam goes form an optically denser medium to an optically thinner medium, there is a maximum angle $\alpha_2$ for which $\alpha_1$ becomes equal to 90°. This is the angle of total internal reflection. In this case all light is reflected back into medium $n_2$. However, in a thin layer of dielectric medium of refractive index $n_1$, on the boundary there is an exponentially decreasing intensity of light that propagates parallel to the interface; this is known as the evanescent wave.

Figure 1:
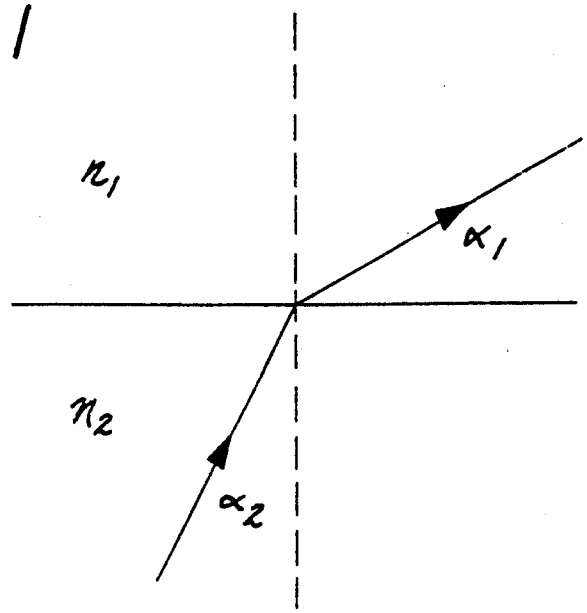
FIG. 1 is a diagrammatic view illustrative of the operation of Snell's Law, a characteristic which is exploited by the invention.
Figure 2:
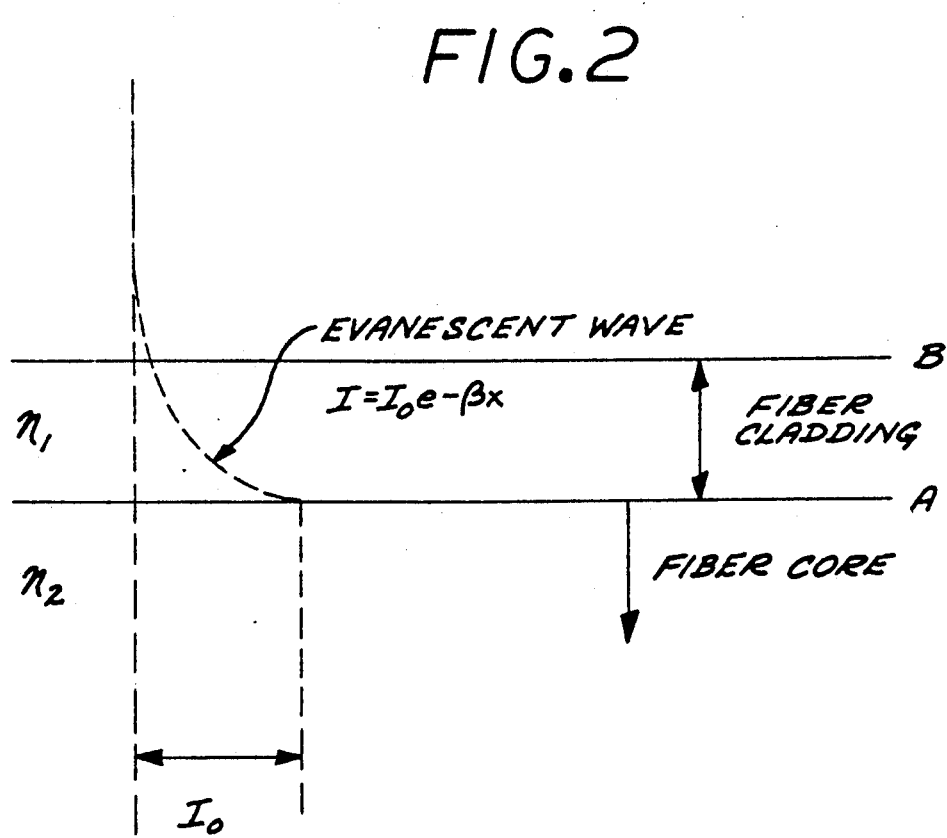
FIG. 2 is a diagrammatic view illustrating the evanescent light wave which propagates parallel to the interface between an optic fiber and its surrounding media.

The light intensity distribution close to the interface A between the two media is shown in FIG. 2. The intensity of the evanescent wave in the medium of refractive index $n_1$ is given (as a function of the distance x from the interface) by eq. 1.

$$I = I_o e^{-\beta x} \qquad (1)$$

where the attenuation coefficient $\beta$ is (for a small glancing angle $90° - \alpha_2$):

$$\beta = \frac{2\pi (n_2^2 - n_1^2)^{\frac{1}{2}}}{\lambda} \quad (2)$$

$$= (2\pi/\lambda)(2n\Delta n)^{\frac{1}{2}}$$

Here $\lambda$ is the wavelength of light and $\Delta n = n_2 - n_1$ ($n \approx n_1 \approx n_2$). For presently available communication fiber the attenuation distance is $-5$ $\mu$m. If one places a liquid surface at B (FIG. 2) with index of refraction higher than $n_1$, part of the radiation leaks through the layer between A and B (the tail part of the exponential decay). In order to exploit the light leakage in a liquid level gauge, the distance between A and B (that is, the fiber cladding thickness) should be selected such that a substantial portion of the initial intensity $I_o$ leaks out over the fiber length 1 (fuel depth).

The Preferred Embodiments

Figure 3:
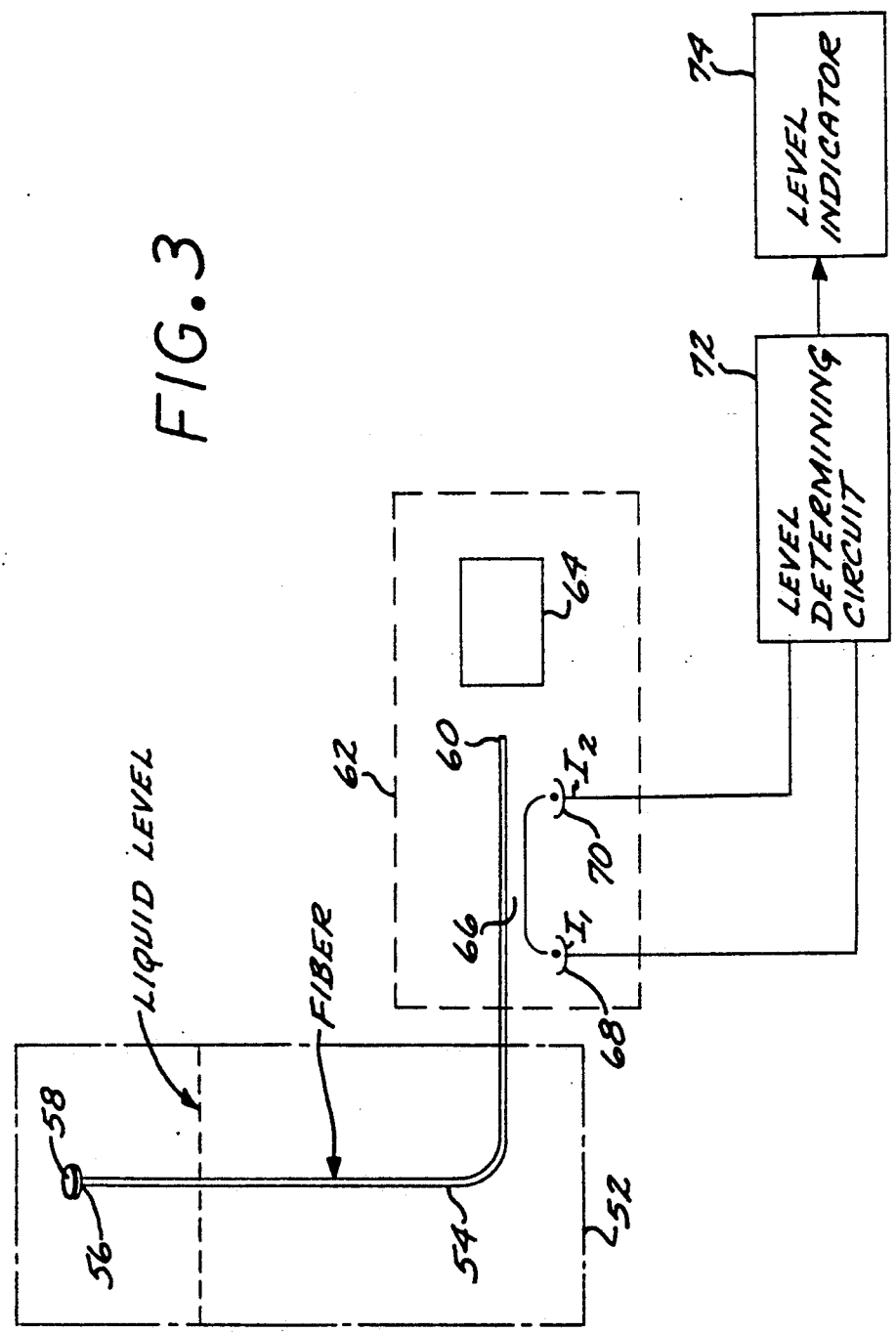
FIG. 3 is a simplified block diagram of a liquid level gauge embodying the invention.

FIG. 3 shows the components of a fiber optic liquid level gauge employing the invention. The fuel or liquid is contained within tank 52, which may, for example, be a vehicle fuel tank. The optical fiber 54 is mounted within the tank 52 such that a first fiber end 56 is supported at an upper level within the tank 52 at least as high as the highest liquid level to be measured by the gauge. The fiber may, for example, be supported within the tank by gluing it to the inner surface of the tank. A fiber end reflector 58 is disposed at a first end 56 of the fiber 52. The fiber 54 extends past a lower level within the tank 52 at least as low as the lowest liquid level to be measured by the gauge. The optical fiber is passed outside the tank to structure 62 which receives the second fiber end 60. A light source 64 such as a semiconductor laser is employed to inject light into the second end 60 of the optical fiber 54. A fiber optic beamsplitter 66 is employed in cooperation with photodetectors 68 and 70. The beamsplitter 66 functions to split off a portion of the light energy injected into the second fiber end 60 by the light source to the photodetector 68, and to split off a portion of the light energy which has traversed the optical fiber 54 and been reflected by the reflector 58, and thus traversing the fiber length twice. The outputs of the photodetectors 68 and 70 are coupled to a level determining circuit 72, which provides an output controlling the liquid level indicator device 74. The circuit 72 is calibrated to the particular tank size and optical fiber, such that a given intensity ratio value is known to correspond to a particular liquid level. The level indicator may be an analog indicator or provide a digital readout.

Fiber beamsplitters suitable for use as beamsplitter 66 are commercially available; for example, the model F506B beamsplitter marketed by Newport Research Corporation, 18235 Mt. Baldy Circle, Fountain Valley, California 92728-8020, is suitable for the purpose.

Photodetectors suitable for use as photodetectors 68 and 70 are commercially available; for example, the model C30808 photodetector device marketed by RCA, 773 Donegal Business Center, P.0. Box 540, Mt. Joy, Pennsylvania 17552, is suitable for the purpose.

The light source 64 may comprise a semiconductor laser such as the model LB1-02 laser marketed by Stantel Components, Inc., 636 Remington Road, Schaumberg, Illinois 60173. Alternatively, other light sources may be used, such as an incandescent light bulb or LED.

The optical fiber should be designed to provide appreciable losses due to evanescent mode propagation over the length of the fiber at fiber/liquid interfaces. For example, assume the liquid is gasoline with a refractive index of about 1.57. An optic fiber comprising a core material of silicon dioxide ($SiO_2$) plus some germanium oxide ($GeO_2$) and having a refractive index of 1.46, and a cladding of pure quartz having a thickness of a few microns with a refractive index of 1.45 may be used.

Various types of optical fibers can be employed with the invention including thin cladding fibers, eccentric core fibers, periodically variable cladding thickness fibers and fibers having double-layered cladding.

The liquid level readout amounts to taking the ratio of the photodetector currents $I_2$ and $I_1$ at photodetectors 68 and 70. $I_1$ gives the light intensity that has traversed the fiber twice. This method of readout $I_2/I_1$ is independent of the intensity of the light source and of the coupling efficiency of light into the fiber. Therefore $I_2/I_1$ is a uniquely defined function of the height of the fuel level, i.e., the length of fiber in the fuel, since the evanescent losses take place only in the fuel.

A gauge in accordance with the invention is usable not just for fuels but for liquids in general (e.g., oil, toxic wastes, drugs, etc.).

If the liquid leaves some residue on the fiber, the light loss is not a unique measure of the fuel level. In some applications, as where the liquid whose level to be measured is gasoline, a thin coating (e.g., a few microns) of fluorinated ethylene polypropylene or tetrafluoroethylene, such as that marketed by DuPont under the registered trademark "Teflon," applied to the optical fiber may prevent the formation of residue on the fiber. Such a thin coating could be applied, for example, by sputtering techniques. However, if the formation of residue is a problem for a particular application, the fiber can be surrounded by a flexible sleeve or membrane that contains a clean liquid, the surface height of which will then correspond to (or be proportional to) the surface height of the fuel or other liquid outside the sleeve. The clean liquid should be selected such that its surface tension does not wet the optical fiber.

Figure 4:
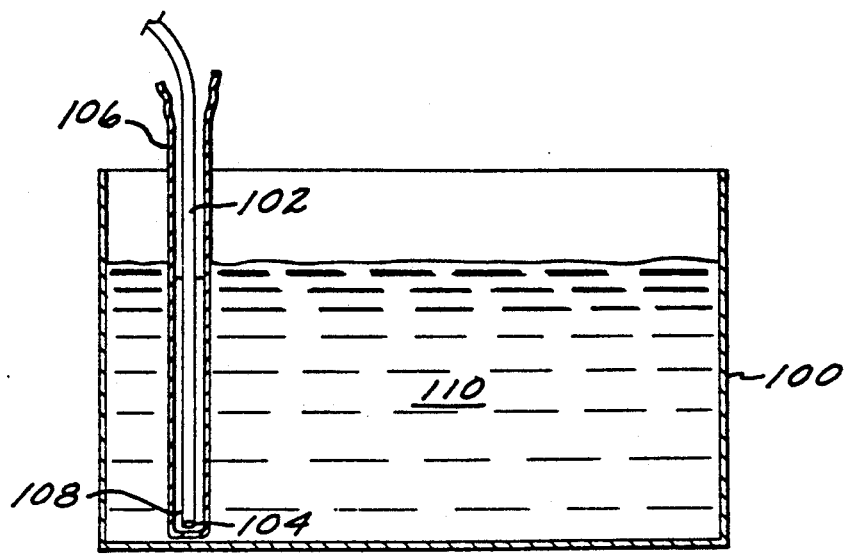
FIG. 4 illustrates an alternate embodiment of an optic fiber arrangement for a gauge embodying the invention.

FIG. 4 illustrates such a flexible membrane employed with a fiber optic liquid level gauge employing the invention. Here the tank 100 contains the liquid 110. The optical fiber 102 is brought in from the top of the tank, and extends downwardly to adjacent the bottom of the tank. The lower end of the fiber 102 is terminated by a fiber end reflector 104. The fiber 102 extends through the top of the tank to the light injection and detection elements as described above regarding the embodiment of FIG. 3. Within the tank 100, the fiber 102 is disposed within a flexible membrane 106. A clean liquid 108 is disposed within the membrane 106. If the fiber cladding is "Teflon," for example, a suitable liquid for use as the clean liquid 108 is glycerin. The membrane 106 may comprise, for example, a fluoro-elastomer such as that sold under the registered trademark "Viton" by DuPont Automotive Products, 950 Stephenson Highway, P.O Box 7013, Troy, Michigan 48007, having a thickness of about 0.001 inch. The height H1, of the liquid 110 is measured from the bottom 111 of container 100 to the top 112 of liquid 110. Height H2, may be determined from the Height H2 of clear liquid 108 as measured from the bottom 107 of membrane 106 to the top 109 of liquid 108. The height H₁ of the liquid 110 is related to the height H₂ of the clear liquid 108 within the membrane 106 by the ratios of the respective densities of the two liquids. The force or pressure exerted by the liquid 110 against the flexible membrane 106 will be balanced by the force exerted by the clear liquid 108 against the flexible membrane. Thus $H_1/D_1 = H_2/D_2$, where $D_1$ and $D_2$ are the respective densities of the liquids 110 and 108. The height $H_2$ is proportional to $H_1$, $D_1$ and $D_2$. It is not necessary that the membrane 106 be flexible throughout its length. For example, only a relative short segment of the membrane adjacent the bottom surface of the tank need be flexible; the remainder of the membrane element 106 could be fashioned from a rigid tube. Thus, the gauge will measure the level of the liquid 108 within the membrane 106, which is in turn indicative of the level of the liquid 110 within the tank 100.

Figure 5:
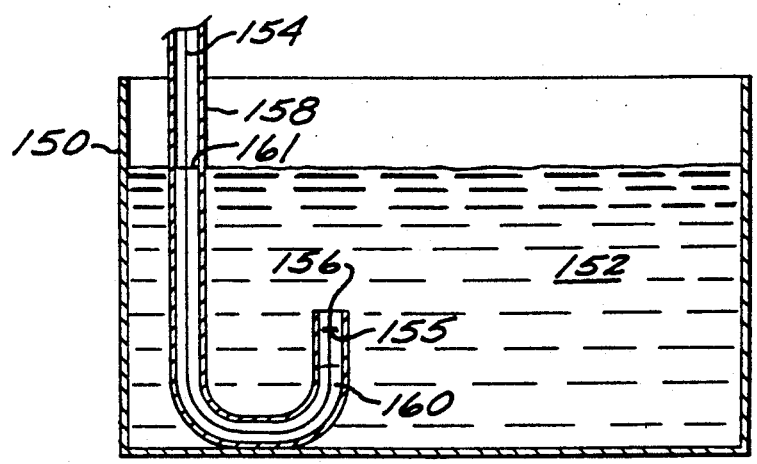
FIG. 5 illustrates a second alternate embodiment of an optical fiber arrangement for a gauge embodying the invention.

FIG. 5 illustrates a second alternate embodiment of a liquid level gauge employing the invention for use in measuring the level of liquid which may leave a residue on the fiber. Here the tank 150 contains a liquid 152 whose level is to be measured by the gauge. The optical fiber 154 in this embodiment is disposed within a rigid "J" shaped tube 185, open at each end thereof. A clean liquid 160, such as metholyne iodide or mercury, is disposed within the tube 158 and has a higher density than the liquid 152. The fiber end 155 is terminated with a fiber reflector 156.

The level 161 of the liquid 160 within the tube 158 will respond to pressure from the liquid 152 in the tank at the liquid 152—liquid 160 interface within the tube 158, so that the level 161 of the liquid 160 within the tube will be proportional to (although not necessarily equal to) the level of the liquid 152 within the tank 150. The output from the level detecting circuit (not shown in FIG. 5) can be calibrated so as to provide proper level indicating signals to the level indicator (not shown in FIG. 5). To restrict undersired flow of the liquid 160 due to movement of the tank, e.g., when mounted within an automobile, a capillary or narrow channel (not shown in FIG. 5) may be formed in the tube 158 close to the interface of liquid 152 and liquid 160. It will also be appreciated that it is not necessary to use a J-shaped tube; other arrangements may employ a straight tube or other tube configurations.

Figure 6:
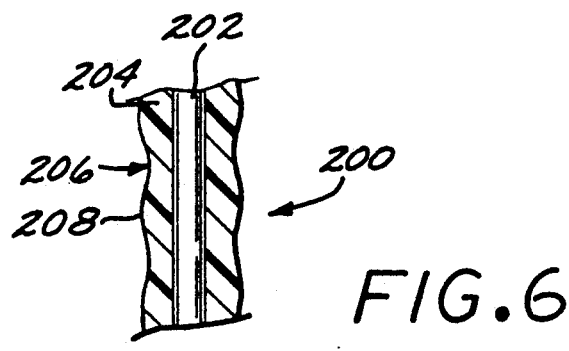
FIG. 6 illustrates an optical fiber having a periodically varying cladding thickness, which fiber may be employed in a gauge as shown in FIG. 3.

FIG. 6 illustrates an optical fiber 200 having a cladding thickness which is periodically variably, i.e., the fiber core 202 is surrounded by a fiber cladding 204 whose thickness varies periodically between regions of reduced thickness 206 and regions of increased thickness 208. The cladding thickness of the regions 206 is selected to provide significant evanescent mode losses when immersed in the liquid whose level is to be measured. The thickness of the regions 208 is selected so that significant evanescent mode losses do not occur in these regions. As a result, when an optical fiber 200 is employed in a liquid level gauge as illustrated in FIGS. 3, 4, or 5, the measured intensity ratio from the gauge photodetectors will have discrete stepped values giving a level reading which is one of a plurality of possible discrete values.

Accuracy

For cubic or parallelepiped shaped gas tanks the ratio $I_2/I_1$ varies exponentially with the fuel height. Other fuel container geometries have to be calibrated individually. The limit of readout accuracy is set by the photon noise (shot noise). For example, with a 30 μWatt light source one could determine the height of the fuel level in a 1 meter high tank with ~0.1 mm accuracy. However, a tilt in a non-stationary gas tank will introduce an error $\Delta h$ in the fuel height (h) equal to $$\frac{\Delta h}{h} = 1 - \cos\alpha$$

where $\alpha$ is the tilt angle. For $\alpha = 10°$ the error is equal to 1.5 percent. This can be reduced (by at least an order of magnitude) by having two fiber gauges on opposite sides of the tank. When the vehicle (that contains the fuel tank) is accelerated the surface of the liquid is tilted by an amount equal to $$\sin\alpha = \frac{a}{g}$$

where a is the acceleration of the vehicle and g is gravitational acceleration (10m/sec²). For example, if a car accelerates from zero to 60 miles/hour in 10 seconds the acceleration a is $$a = 2.7 \text{m/sec}^2$$

So the angle $\alpha$ is $$\alpha = \arcsin\frac{a}{g} \simeq 15°$$

and the readout error is $$\frac{\Delta h}{h} = (1 - \cos 15°) = 3.6\%$$

This can again be reduced, if desired, by using two readout fibers. Of course, the fuel level in a moving vehicle will have waves on it and, therefore, the readout will have to be averaged over a period of a few seconds (depending on the desired accuracy).

It is understood that the above-described embodiments are merely illustrative of the possible specific embodiments which may represent principles of the present invention. Other arrangements may readily be devised in accordance with these principles by those skilled in the art without departing from the scope of the invention.

what is claimed is:

1. A fiber optic liquid level gauge for measuring the level of a first liquid in a container, comprising:
    an optical fiber disposed within the container and extending through the range of liquid surface positions to be measured by the gauge, wherein the optical fiber is characterized by an inner fiber core and an outer fiber cladding, the thickness of fiber cladding on the fiber portion which extends through said range of positions being selected to provide significant evanescent wave loss when the cladding is immersed in the liquid;
    a light source for injecting light into said fiber;
    measuring means for measuring the degree of light intensity loss at the fiber/liquid interface, and providing an intensity loss signal indicative of the light intensity loss;
    liquid level indicating means responsive to said intensity loss signal for indicating the liquid level in the container; and a quantity of a second liquid disposed within the flexible membrane, whereby the surface level of the second liquid within the flexible membrane is indicative of the surface level of the first liquid within the tank.

2. The gauge of claim 1 wherein the second liquid is characterized by a surface tension such that the second liquid does not wet the optical fiber.

3. A fiber optic liquid level gauge for measuring the level of a first liquid in a container, comprising:

an optical fiber having a first end and a second end disposed in said container and extending within the container through the range of liquid surface levels to measured, the optical fiber characterized by an inner fiber core and an outer fiber cladding, the thickness of the fiber cladding being selected to provide significant evanescent wave loss at fiber/liquid interfaces;

reflector means at said first end of said optical fiber;

a light source for injecting light into said second end of said fiber;

a first optical coupler for coupling off a portion of the light being injected into the optical fiber;

a second optical coupler adjacent said second end for coupling off a portion of the light which has traversed the fiber and been reflected from the optical reflector at the first end;

means for comparing the light intensity from the first optical coupler with the light intensity from the second optical coupler to determine the liquid level; and a quantity of a second liquid disposed within the flexible membrane, whereby the surface level of the second liquid within the flexible membrane is indicative of the surface level of the first liquid within the tank.

4. The gauge of claim 3 wherein the second liquid is characterized by a surface tension such that the second liquid does not wet the optical fiber.

* * * * *